United States Patent Office 3,300,479
Patented Jan. 24, 1967

3,300,479
DEAZAPURINE RIBOSIDE CYCLIC 3',5'-PHOSPHATES AND PROCESS THEREFOR
Arthur R. Hanze, Kalamazoo, Mich., assignor to The Upjohn Company, Kalamazoo, Mich., a corporation of Delaware
No Drawing. Filed Aug. 5, 1965, Ser. No. 477,580
5 Claims. (Cl. 260—211.5)

The present invention relates to novel cyclic nucleoside phosphates and is specifically concerned with deazapurine riboside cyclic 3',5'-phosphates (9-β-D-ribofuranosyl-7-deazapurine cyclic 3',5'-phosphates) and a process of production therefor.

The process of the present invention and the novel products (II) can be illustratively represented by the following sequence of formulae:

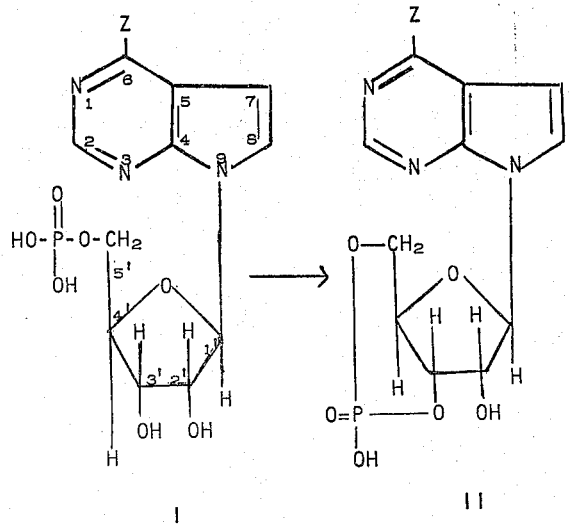

wherein Z is selected from the group consisting of hydrogen, hydroxy, amino, acylamino, in which the acyl radical is of a hydrocarbon carboxylic acid containing from 2 to 12 carbon atoms, inclusive, mercapto and alkylmercapto in which the alkyl group has from 1 to 4 carbon atoms, inclusive.

The process of the present invention comprises: treating a 7-deazapurine riboside phosphate (I) in a basic solution with a condensing agent; preferably a dialkyl or dicycloalkyl carbodiimide, to give the corresponding 7-deazapurine riboside cyclic 3',5'-phosphate (II).

The novel 7-deazapurine riboside 3',5'-phosphates (II) exhibit significant cytotoxic activity in vitro, especially against KB tumor cells, and against viruses, particularly the different types of Herpes, Coe, and vaccinia viruses. For this reason the novel products can be employed for cleaning glassware and instruments used in the growing of tissue cultures in virus and tumor research, washing excised tumor tissue, intended for transplant into animals, to inhibit the growth of any KB tumor cells that might otherwise seed surrounding tissues or be transported to other parts of the animal body. The antiviral activity can also be used to prepare cultures of microorganisms free of viral phages, e.g., phage-free, antibiotic-producing Streptomyces cultures. The compound can be administered orally, parenterally or topically in aceptable pharmaceutical carriers.

The 7-deazapurine riboside 5'-phosphates are known [J. E. Pike et al., J. of Heterocyclic Chemistry 1, 159 (1964)] or are produced as shown in the subsequent preparations.

In carrying out the process of the present invention, a 7-deazapurin riboside 5'-phosphate is heated together with a condensing agent in a basic solution. The solvents used in this procedure are mostly pyridine, methylpyridine, ethylpyridine, lutidines, morpholine, and the like, with pyridine preferred. Since basic conditions are necessary a strong base is added, which is soluble in pyridine such as trimethylamine, or preferably 4-morpholinyl-N, N'-dicyclohexylcaboxamidine of the formula

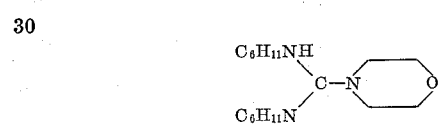

in which $C_6H_{11}$ is a cyclohexyl radical. For best yields the reaction is carried out in completely anhydrous conditions. This is achieved by concentrating an anhydrous pyridine solution of the reagents at reduced pressure until a dry residue remains. This procedure is often repeated to assure absolute dryness. The condensation reaction is carried out at higher temperature, preferably the refluxing temperature of the reaction mixture. The reaction time varies between a few minutes and several hours, with average reaction times generally between 1 hour and 6 hours. After the reaction is terminated, water is added to the reaction mixture, thus converting the unreacted carbodiimide to a water insoluble urea. Generally, filtration is used to remove the water insoluble urea. The product is obtained from the aqueous solution by conventional means such as concentration or lyophilization of the solution, and purified by conventional means, such as chromatography, solvent distribution in a Craig extractor, electrophoresis, and the like.

The following preparations and examples are illustrative of the product and process of the present invention, but are not to be construed as limiting.

PREPARATION 1

*9 - β - D - ribofuranosyl-7-deazaadenine 5'-phosphate [9-β-D-ribofuranosyl-6-amino - 7 - deazapurine 5'-phosphate (VI),(Sparsomycin A 5'-phosphate)]* is also referred to in the literature as tubercidin; however the name Sparsomycin A is herein preferred.

(1) Sparsomycin A (III)

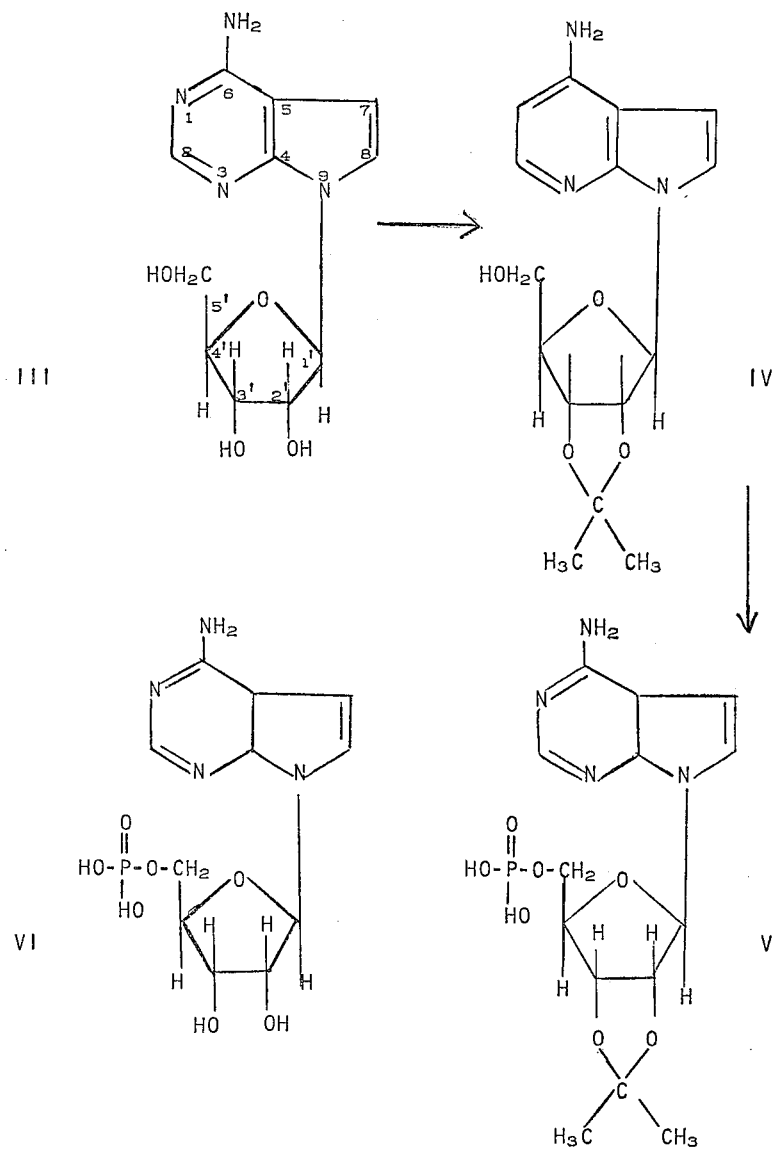

The compound III below, 9-β-D-ribofuranosyl-7-deazaadenine

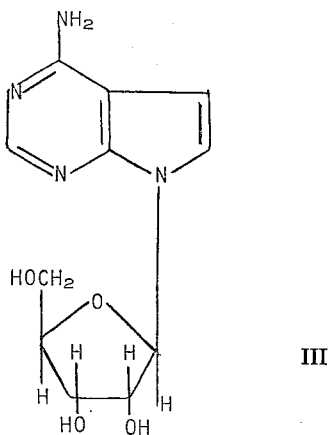

A. *Fermentation.*—A soil slant of *Streptomyces sparsoqenes* var. *sparsoqenes*, NRRL 2940, was used to inoculate a series of 500-ml. Erlenmeyer flasks each containing 100 ml. of seed medium consisting of the following ingredients:

Glucose monohydrate _____grams__ 25
Pharmamedia [1] _____do____ 25
Tap water q.s., 1 liter.

[1] Pharmamedia is an industrial grade of cottonseed flour produced by Traders Oil Mill Co., Fort Worth, Texas.

The seed medium presterilization pH was 7.2. The seed was grown for two days at 28° C. on a Gump rotary shaker operating at 250 r.p.m.

One shake flask of the seed described above (100 ml.) was used to inoculate a 20 liter seed tank containing 15 liters of the above sterile seed medium (S–1) plus 1 ml./l. of lard oil. The seed tank was grown for 24 hours at a temperature of 28° C., aeration rate of 10 standard liters/min., and agitated at a rate of 400 r.p.m.

The seed tank, described above, was then used to inoculate a 380-liter fermentor containing 250 liters of the following sterile medium:

Glucose monohydrate, g./liter ---------------------- 10
Dextrin, g./liter -------------------------------- 15
Pharmamedia, g./liter ---------------------------- 20
Wilson's Peptone Liquor No. 159 [1], g./liter -------- 5
Lard oil, ml./liter ------------------------------ 2
Tap water, balance.

[1] Wilson's Peptone Liquor No. 159 is a preparation of hydrolyzed proteins from animal origin.

The fermentation then proceeded for 113 hours during which time the temperature was controlled at 28° C., filtered air supplied at a rate of 100 standard liters/minute, and agitation at 28 r.p.m. During the course of the fermentation, 1850 ml. of lard oil was added as an antifoam.

B. *Recovery*.—The whole beer from the above fermentation was adjusted from the harvested pH of 7.1 to pH 2.4 with 350 ml. of sulfuric acid (concentrated) and filtered using 3.6% diatomaceous earth as filter acid. The filter cake was washed with 0.2 volume of deionized water, the clear beer plus wash (vol. 280 liters) was adjusted to pH 7.35 with 300 ml. of 50% aqueous sodium hydroxide and allowed to stand overnight at 10° C. The clear beer was then adjusted to pH 8 with 50 ml. of 50% aqueous sodium hydroxide and stirred one hour with 1% decolorizing carbon and 3% diatomite. The mixture was filtered and the carbon cake washed with 0.2 volume of 20% aqueous acetone. The washed carbon cake was eluted twice with 0.4 volume of 50% aqueous acetone, acidified to pH 2.5 with concentrated sulfuric acid, and the eluates pooled. The pooled acetone eluate (72 liters) was adjusted to pH 6.4 with 30 ml. of 50% aqueous sodium hydroxide and concentrated to an aqueous solution (40 liters). The concentrate was adjusted to pH 5.9 and freeze dried to give 447 g. of lyophilized material.

An additional 1126 g. was obtained by twice repeating the above fermentation and recovery. The combined lylophilized material (1573 g.) was slurried in 10 liters of methanol at 40° C. for one hour. Insoluble material was filtered off and washed three times with 500 ml. of warm methanol (40° C.). The methanol extracts and washes were combined (1.5 liters) and concentrated in vacuo to a dry preparation weighing 321 g. (HRV–25.3) and assaying 1.25 *Proteus vulgaris* biounits/mg.

C. *Purification, parition column*.—Three hundred grams of the above preparation (HRV–25.3) was placed in a partition column which was prepared and developed in the following manner. A solvent system was made using equal volumes (350 liters) of McIlvain's pH 6.0 buffer and methyl ethyl ketone. A slurry containing 9.6 kg. of diatomite in 60 liters of upper phase and 4.8 liters of lower phase of the above-described solvent system was poured into a 12″ column and packed with 4 p.s.i.g. of nitrogen. The column feed was dissolved in 3 liters of lower phase, slurried with 1920 g. of diatomite and enough upper phase added to make it mobile. The feed was carefully added to the top of the column bed which was covered with a layer of sea sand. The column was eluted with upper phase solvent at a rate of 2 l./minute. Four-liter fractions were collected except at the beginning and end of the column when 20-liter fractions were collected. The fractions were concentrated and bio-activities observed on *P. vulgaris* trays. At this point in the process the separation of sparsomycin and sparsomycin A was effectuated. Further processing purified these components and ultimately resulted in crystalline material.

Fractions 24–34, inclusive, from the above partition column contained the sparsomycin component.

*Purification of sparsomycin A*.—The sparsomycin A component was purified and crystallized in the following manner. Fractions 11–20, inclusive, from the previously described partition column—part C—contained the sparsomycin A component. These fractions were pooled and concentrated under reduced pressure and 7.2 grams of crystalline material was isolated. These crystals were dissolved in 400 ml. of water and 50 ml. of 0.1 N HCl. The solution was heated gently to facilitate dissolving and then filtered. The clear solution was adjusted to pH 9.0 with 50% aqueous sodium hydroxide and chilled in the refrigerator for 5 hours. The crystals were collected by filtration, washed with water, and dried to give 5.65 grams of preparation ADA–102.1. Two grams of this preparation were then dissolved in 75 ml. of water and 20 ml. of 0.1 N HCl. This clear solution was adjusted to pH 9.0 with 50% aqueous sodium hydroxide. Crystallization started immediately. The solution was left at 25° C. for 7 hours and then the crystals were collected, washed with 25 ml. of water, and dried to yield 1.52 grams of preparation ADA–105.1 having a melting point of 247.8–250° C., an optical rotation $[\alpha]_D^{25}$ −62° (c.=.718 in 0.1 N HCl), an equivalent weight of 269, pka' of 5.07 in water, an ultra-violet absorption spectrum in Water—270 m$\mu$, a=44.14
0.01 N $H_2SO_4$—227 m$\mu$, a=85.28; 271 m$\mu$, a=40.82
0.01 N KOH—270 m$\mu$, a=43.50 a characteristic IR absorption at the following frequencies expressed in reciprocal centimeters

| | | |
|---|---|---|
| 3350 (S) | 1426 (M) | 1042 (S) |
| 3250 (S) | 1370 (M) (oil) | 1017 (S) |
| 3145 (S) | 1351 (M) | 992 (S) |
| 3095 (S) (sh) | 1306 (M) | 953 (W) |
| 2880 (S) (oil) | 1276 (W) | 912 (W) |
| 2810 (S) (oil) | 1255 (S) | 903 (M) |
| 1895 (W) | 1241 (M) | 867 (M) |
| 1640 (S) | 1198 (M) | 852 (W) |
| 1592 (S) | 1160 (W) | 842 (W) |
| 1553 (M) | 1134 (M) | 799 (W) |
| 1502 (M) | 1120 (M) | 715 (W) |
| 1475 (M) | 1093 (M) | 704 (S) |
| 1458 (S) (oil) | 1080 (W) | 675 (M) |
| 1445 (M) (sh) | 1055 (M) | 658 (M) | and the following elemental analysis:

*Analysis*.—Calcd. for $C_{11}H_{14}N_4O_4$: C, 49.62; H, 5.30; N, 21.04. Found: C, 49.81; H, 5.20; N, 20.92.

Sparsomycin A (III) was also isolated and purified from fermentation broth in another manner. The fermentation was carried on as described above under A. The whole beer (AJW–63) was adjusted to pH 2.5 with 365 ml. of concentrated sulfuric acid and filtered using 6% diatomaceous earth as filter aid. The filter cake was washed with 0.1 volume of deionized water and the wash added to the clear beer. The clear beer was then adjusted to pH 8.0 with 400 ml. of 50% aqueous sodium hydroxide and stirred one hour with 1% decolorizing carbon and 3% diatomite. The mixture was filtered and the carbon cake washed with 0.1 volume of deionized water followed by 0.2 volume of 20% aqueous acetone. The washed carbon was eluted twice with 0.4 volume of 40% aqueous acetone which had been acidified to pH 2.5 with concentrated sulfuric acid, and the eluates were pooled. The pooled acetone eluates were then adjusted to pH 4.8 with 53 ml. of 50% aqueous sodium hydroxide, concentrated to an aqueous solution and freeze-dried to yield 284 grams of preparation WMH–32.6 assaying 9 KB $\mu$/mg. in tissue culture. One hundred grams of this preparation was then dissolved in 600 ml. of methanol and 4 volumes of ether added to precipitate the inactive material. From the methanol-ether supernatant two crops of crystalline material were isolated by allowing the solvent to evaporate slowly. These preparations were pooled and redissolved in 35 ml. of water and 5 ml. of 0.1 N hydrochloric acid. The solution was then filtered and adjusted to pH 9.4 with 50% aqueous sodium hydroxide. The sparsomycin A which separated in crystalline form was collected, washed with water, and dried to give 480 mg. of preparation ADA–104.1 having a melting point of 247.8–250.8° C., an optical rotation $[\alpha]_D^{25}$ —61° (c.=0.908 in 0.1 N HCl), an equivalent weight of 270, pKa' of 5.05 in water, an ultra-violet absorption spectrum in Water—269.5 mμ, a=44.27
0.01 N $H_2SO_4$—227 mμ, a=86.06; 271 mμ, a=41.35
0.01 N KOH—270 mμ, a=43.61 a characteristic IR absorption at the following frequencies expressed in reciprocal centimeters:

| | | |
|---|---|---|
| 3400 (S) | 1600 (S) | 1092 (S) |
| 3310 (S) | 1462 (S) (oil) | 1084 (M) |
| 3240 (S) | 1425 (S) | 1057 (M) |
| 3220 (S) | 1370 (M) (oil) | 1045 (S) |
| 3140 (S) | 1355 (S) | 1020 (S) |
| 2950 (S) (oil) | 1342 (M) | 995 (S) |
| 2920 (S) (oil) | 1310 (S) | 870 (S) |
| 2850 (S) (oil) | 1285 (M) | 852 (W) |
| 2620 (M) | 1280 (M) | 843 (W) |
| 1910 (W) | 1200 (M) | 955 (M) |
| 1650 (S) | 1164 (M) | 905 (M) |
| 1645 (S) | 1137 (S) | 800 (M) |
| 1526 (S) | 1260 (S) | 715 (S) |
| 1510 (M) | 1245 (S) | 702 (S) |
| 1480 (S) | 1125 (M) | |

9-β-D-ribofuranosyl-7-deazaadenine (sparsomycin A) has a characteristic papergram pattern and the following elemental analysis:

*Analysis.*—Calcd. for $C_{11}H_{14}O_4O_4$: C, 49.62; H, 5.30; N, 21.04. Found: C, 49.62; H, 5.04; N, 20.81.

The characteristics of sparsomycin A, described above, are in good agreement with those reported in the literature for tubercidin. See Anzai, K.; G. Nakamura and S. Suzuki: A new antibiotic, tubercidin. J. Antibiotics, Ser. A, pp. 201–204, September 1957. However, no process whereby tubercidin can be produced is disclosed.

(2) 2′,3′-O-isopropylidenesparsomycin A (IV)

A mixture of 1 g. of sparsomycin A which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. and a solution of 200 ml. of 0.5 N sodium bicarbonate at 3° C. was added. The resulting solution was evaporated to dryness at 35° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 2′,3′-O-isopropylidene sparsomycin A weighing 0.75 g. (65%) and having a melting point of 170–173° C.

After two additional recrystallizations from water 2′,3′-O-isopropylidenesparsomycin A (IV) of melting point 174–177° C. was obtained having the following analysis:

*Analysis.*—Calcd. for $C_{14}H_{18}N_4O_4$: C, 54.89; H, 5.92; N, 18.29; O, 20.92; $CH_3C$, 4.92. Found: C, 54.72; H, 5.92; N, 18.51; O, 21.2; $CH_3C$, 4.3.

(3) 2′,3′-O-isopropylidenesparsomycin A 5′-dihydrogenphosphate (V) and sparsomycin A 5′-dihydrogenphosphate (VI)

A mixture of 2.78 g. (9.1 mmoles) of 2′,3′-O-isopropylidenesparsomycin A, 20 ml. of β-cyanoethyl dihydrogenphosphate reagent [50 mmoles prepared according to G. M. Tener, J. Am. Chem. Soc., 83, 159 (1959)] and 120 ml. of dry pyridine was evaporated to dryness under reduced pressure at about 40° C. The thus-obtained residue was dissolved in 120 ml. of dry pyridine and the solution was again evaporated to dryness in the same way. This procedure was repeated twice. The residue was then dissolved in 120 ml. of dry pyridine, and 24 g. (0.12 mole) of N,N′-dicyclohexylcarbodiimide was added. The solution was allowed to stand at room temperature for a period of 18 hours. Twelve milliliters of water was added, and the mixture was filtered after it had stood for 45 minutes. The filtrate was extracted with two 100-ml. portions of Skellysolve B hexanes. The aqueous layer was evaporated to dryness under reduced pressure. The residue was mixed with 480 ml. of 0.4 molar lithium hydroxide solution, and the mixture was boiled for one hour. The cooled reaction mixture was filtered and the filtrate was extracted with two 100-ml. portions of ether. The aqueous solution was passed over 200 ml. of a cation exchange resin (IRC–50) and the resin was washed with 400 ml. of water. The combined effluent and washings (835 ml.) had a pH of 4.7. The pH was thereupon adjusted to 2.5 with the addition of 1 N aqueous sulfuric acid and the acidic solution was boiled for 1½ hours. The solution was then concentrated to 280 ml. under reduced pressure and adjusted to a pH of 7.5 with saturated barium hydroxide solution. The precipitate of barium sulfate was removed by centrifugation and the supernatant liquid was diluted with 1280 ml. (2 vols.) of ethyl alcohol. Refrigeration gave a precipitate which was removed by filtration and the filter cake was washed with alcohol and ether. The filter cake was thereupon dried weighing 1.62 g. and consisting mainly of the barium salt of sparsomycin A 5′-phosphate. Also, lithium and sodium salts are present.

Two grams of such material was heated in 50 ml. of water and the mixture was filtered. The filtrate was applied to 100 ml. of Dowex-1×8 (formate cycle). The column was developed with 500 ml. portions of 0.01 N, 0.02 N, 0.04 N, and 0.08 N formic acid collecting 10-ml. portions. Fractions 31–60 were combined and evaporated to dryness under reduced pressure. The residue was triturated with 10 ml. of water, and the mixture was refrigerated. The crystals of sparsomycin A 5′-phosphate(VI) were collected by filtration, weight 236 mg., melting point 255–265° C. with decomposition.

*Analysis.*—Calcd. for $C_{11}H_{15}N_4O_7P$: C, 38.16; H, 4.37; N, 16.18; P, 8.95. Found: C, 38.25; H, 4.57; N, 16.17; P, 9.06.

PREPARATION 2

*6-methylmercapto-9-(2′,3′-O-isopropylidene-β-D-ribofuranosyl)-7-deazapurine*

A solution of 6-mercapto-9-β-D-ribofuranosyl-7-deazaadenine (1 gm.) in 8 ml. of 0.4 N sodium hydroxide was shaken at about 24° C. for a period of 10 minutes while .21 ml. of methyl iodide was added in portions. Another portion of 1.3 ml. of 0.4 N sodium hydroxide was added and the solution was shaken again with 0.21 ml. of methyl iodide. The reaction mixture was allowed to stand for 4 hours at room temperature and thereupon in a refrigerator overnight for 20 hours at about 0 to 5° C. The solids which separated were collected and filtered, dried over sodium hydroxide, refluxed for several minutes with 6 ml. of absolute methanol and chilled yielding white needles which were recovered by filtration. The white material was 6-methyl-mercapto-9-β-D-ribofuranosyl-7-deazaadenine.

A mixture of 1 g. of 6-methylmercapto-9-β-D-ribofuranosyl-7-deazaadenine which had been dried overnight at 108° C. under a reduced pressure of 0.3 mm., 7.5 g. of p-toluenesulfonic acid monohydrate and 50 ml. of acetone which previously had been distilled from potassium permanganate and potassium carbonate in that order, was stirred at room temperature for a period of 2 hours. The reaction mixture was then cooled to 3° C. under reduced pressure. The residue thus obtained was extracted first with two 100-ml. portions of boiling chloroform and then with two 100-ml. portions of chloroform at room temperature. These extracts were filtered individually, then combined and evaporated. The thus-obtained residue was dissolved in 25 ml. of boiling water and the resulting solution was filtered. Refrigeration of the filtrate gave a crystalline precipitate of 6-methyl-mercapto-9 - (2',3' - O - iospropylidene - β - D - ribofuranosyl) - 7-deazapurine.

Substituting in Preparation 2 for methyl iodide another lower alkyl iodide, e.g., ethyl iodide, propyl iodide, isopropyl iodide, butyl iodide, isobutyl iodide and the like other 6-alkyl mercapto-9-(2',3'-O-isopropylidene-β-D-ribofuranosyl)-7-deazapurine compounds are obtained, such as 6 - ethylmercapto-9-(2',3'-O-isopropylidene-β-D-ribofuranosyl)-7-diazapurine, 6 - propylmercapto-9-(2',3'-O-isopropylidene-β-D-ribofuranosyl)-7-diazapurine; 6-isopropylmercapto - 9 - (2',3' - O - isopropylidene - β - D-ribofuranosyl)-7-deazapurine; 6-butylmercapto-9-(2',3'-O-isopropylidene - β - D-ribofuranosyl)-7-diazapurine; 6-isobutylmercapto - 9 - (2',3' - O - isopropylidene - β - D-ribofuranosyl)-7-deazapurine, and the like.

PREPARATION 3

*6-methylmercapto-9-β-D-ribofuranosyl-7-deazapurine 5'-phosphate*

In the manner given in Preparation 1(3) 6-methylmercapto - 9 - (2',3' - O - isopropylidene - β - D - ribofuranosyl)-7-deazapurine was phosphorylated with β-cyanoethyl dihydrogenphosphate in the presence of N,N'-dicyclohexylcarbodiimide. The resulting β-cyanoethyl phosphate was treated with lithium hydroxide and the resulting product was reached with 1 N aqueous sulfuric acid and finally with barium hydroxide to give 6-methylmercapto-9-β-D-ribofuranosyl-7-deazapurine 5'-phosphate.

In the same manner given in Preparation 3, other 6-alkylmercapto-9-β-D-ribofuranosyl-7-deazapurine 5'-phosphate can be produced such as the 6-ethyl-(6-propyl-, -isopropyl-, butyl, -isobutyl-)mercapto-9-β-D-ribofuranosyl-7-deazapurine 5'-phosphate.

EXAMPLE 1

*Sparsomycin A cyclic 3',5'-phosphate [9-β-D-ribofuranosyl-7-deazadenine cyclic 3',5'-phosphate]*

A solution of 346 mg. (1 millimole) of sparsomycin A 5'-phosphate and 293 mg. (1 millimole) of 4-morpholinyl-N,N'-dicyclohexylcarboxamidine in 5 ml. of water and 20 ml. of pyridine was concentrated to dryness under reduced pressure in a bath at 35–40° C. Anhydrous pyridine was then added and the solution was again concentrated. This procedure was repeated three times to insure that all water had been removed. The syrupy residue was taken up in 100 ml. of anhydrous pyridine and added dropwise through a condenser to a boiling solution of 412 mg. (2.0 millimoles) of dicyclohexylcarbodiimide in 100 ml. of pyridine over a period of 140 minutes. After all the material had been added, the mixture was refluxed 80 minutes and then concentrated under reduced pressure in a bath at 40° C. The residue was taken up with 100 ml. of water and 100 ml. of ether; the ether layer was discarded and after 2 hours the water layer was filtered to remove the insoluble dicyclohexylurea, and the aqueous filtrate lyophilized to give 0.6 g. of a white fluffy solid. This solid was dissolved in 4 ml. of water, activated charcoal (Darco G–60) was added and the solution was filtered through Celite diatomaceous earth. The thus-obtained solution was acidified until the pH was between 2–3 and set into a refrigerator for 48 hours. Thereafter the solution was filtered, and concentrated yielding 250 mg. of sparsomycin A cyclic 3',5'-phosphate having λ H₂O(pH 2) max. 226 mμ (ε 19,200); 270 (ε 8750).

*Analysis.*—Calcd. for $C_{11}H_{13}N_4O_6P \cdot 3/2H_2O$: C, 37.2; H, 4.54; N, 15.75; P, 8.73. Found: C, 37.22; H, 4.53; N, 16.07; P, 8.58.

The product is incompletely split by purified snake venom phosphodiesterase in 24 hours at 37° to give sparsomycin A-5'-phosphate and/or sparsomycin A 3'-phosphate. With crude snake venon (*crotalus admanteus*) sparsomycin A cyclic 3',5'-phosphate is cleaved to give sparsomycin A 3'-phosphate and sparsomycin.

By thin layer chromatography on cellulose with a solvent system (consisting of isopropanol: conc. NH₄OH:H₂O, 7:1:2) the sparsomycin A 3',5'-cyclic phosphate has an $R_f$ of approximately 0.5, whereas sparsomycin A 5'-phosphate remains at the origin.

EXAMPLE 2

*9-β-D-ribofuranosyl-7-deazapurinecyclic 3',5'-phosphate*

A solution of 340 mg. of 9-β-D-ribofuranosyl-7-deazapurine 5'-phosphate and 300 mg. of 4-morpholinyl-N,N'-dicyclohexylcarboxamidine in 5 ml. of water and 20 ml. of pyridine was concentrated to dryness under reduced pressure in a bath at 35–40° C. Anhydrous pyridine was then added and the solution was again concentrated. This procedure was repeated three times to insure that all water had been removed. The syrupy residue was taken up in 100 ml. of anhydrous pyridine and added dropwise through a condenser to a boiling solution of 412 mg. (2.0 millimoles) of dicyclohexylcarbodiimide in 200 ml. of pyridine over a period of 140 minutes. After all the material had been added, the mixture was refluxed 80 minutes and then concentrated under reduced pressure in a bath at 40° C. The residue was taken up with 100 ml. of water and 100 ml. of ether; the ether layer was discarded and after 2 hours the water layer was filtered to remove the insoluble dicyclohexylurea and the aqueous filtrate lyophilized to give a white solid. This solid was dissolved in 4 ml. of water, activated charcoal (Darco G–60) was added and the solution was filtered through Celite diatomaceous earth. The thus-obtained solution was acidified until the pH was between 2–3, set into a refrigerator for 48 hours and filtered to yield as a white solid 9-β-D-ribofuranosyl-7-deazapurine cyclic 3',5'-phosphate.

EXAMPLE 3

*9-β-D-ribofuranosyl-6-methylmercapto-7-deazapurine cyclic 3',5'-phosphate*

A solution of 9-β-D-ribofuranosyl-6-methylmercapto-7-deazapurine 5'-phosphate and 4-morpholinyl-N,N'-dicyclohexylcarboxamidine in water and pyridine was concentrated to dryness under reduced pressure in a bath at 35–40° C. Anhydrous pyridine was then added and the solution was again concentrated. This procedure was repeated three times to insure that all water had been removed. The residue was taken up in anhydrous pyridine and added dropwise through a condenser to a boiling solution of dicyclohexylcarbodiimide in pyridine. After all the material had been added, the mixture was refluxed and then concentrated under reduced pressure. The residue was taken up with water and ether; the ether layer was discarded and after 2 hours the water layer was filtered to remove the insoluble dicyclohexylurea, and the aqueous filtrate lyophilized to give a white solid. This solid was dissolved in water, activated charcoal (Darco G–60) was added and the solution was filtered through Celite diatomaceous earth. The thus-obtained solution was acidified until the pH was between 2–3 and set into a refrigerator for 48 hours. Thereafter the solution was filtered and concentrated yielding 9-β-D-ribofuranosyl-6-methylmercapto-7-deazapurine cyclic 3',5'-phosphate.

In the manner given in Example 1 other 9-β-D-ribofuranosyl-7-deazapurine cyclic 3',5'-phosphates can be produced by bringing to reflux a selected 9-β-D-ribofuranosyl-7-deazapurine 5'-phosphate with a condensing agent such as dialkyl or dicyclo alkyl carbodiimide in pyridine solution under anhydrous conditions. Representative compounds thus obtained include:

9-β-D-ribofuranosyl-6-hydroxy-7-deazapurine cyclic 3′,5′-phosphate,
9-β-D-ribofuranosyl-6-mercapto-7-deazapurine cyclic 3′,5′-phosphate,
9-β-D-ribofuranosyl-6-ethylmercapto-7-deazapurine cyclic 3′,5′-phosphate,
9-β-D-ribofuranosyl-6-propylmercapto-7-deazapurine cyclic 3′,5′-phosphate,
9-β-D-ribofuranosyl-6-butylmercapto-7-deazapurine cyclic 3′,5′-phosphate,
N⁶-benzoyl-9-β-D-ribofuranosyl-7-deazaadenine cyclic 3′,5′-phosphate,
N⁶-anisoyl-9-β-D-ribofuranosyl-7-deazaadenine cyclic 3′,5′-phosphate,
N⁶-acetyl-9-β-D-ribofuranosyl-7-deazaadenine cyclic 3′,5′-phosphate, and the like.

We claim:
1. A 9-β-D-ribofuranosyl-7-deazapurine cyclic 3′,5′-phosphate:

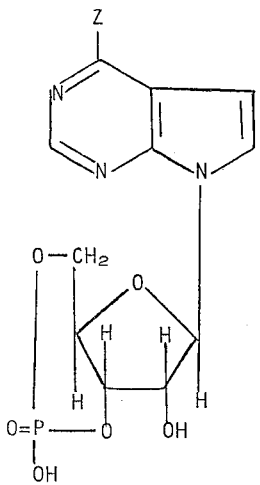

wherein Z is selected from the group consisting of hydrogen, hydroxy, amino, acylamino in which the acyl group has from 2 to 12 carbon atoms, inclusive, mercapto and alkylmercapto in which the alkyl group has from 1 to 4 carbon atoms, inclusive.

2. Sparsomycin A cyclic 3′,5′-phosphate of the formula:

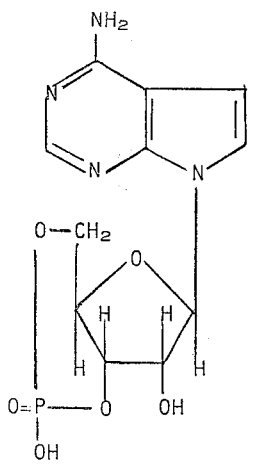

3. A process for the production of a 9-β-D-ribofuranosyl-7-deazapurine cyclic 3′,5′-phosphate of the formula:

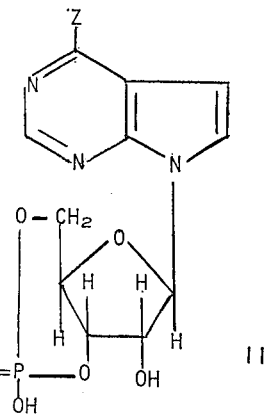

wherein Z is selected from the group consisting of hydrogen, hydroxy, amino, acylamino in which the acyl group has from 2 to 12 carbon atoms, inclusive, mercapto and alkylmercapto in which the alkyl group has from 1 to 4 carbon atoms, inclusive, which comprises: heating a 9-β-D-ribofuranosyl-7-deazapurine 5′-phosphate of the formula:

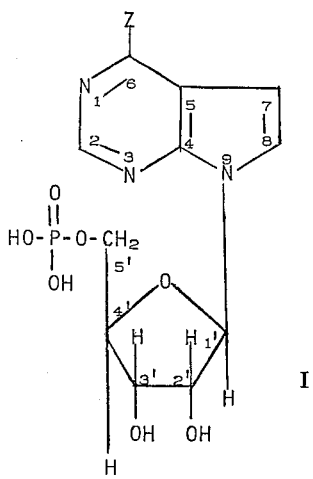

wherein Z is defined as above, with a condensing agent selected from the group consisting of dialkylcarbodiimides and cycloalkylcarbodiimides in a basic, anhydrous solvent medium to give the corresponding 9-β-D-ribofuranosyl-7′-deazapurine cyclic 3′,5′-phosphate of above formula 11.

4. A process for the production of sparsomycin A cyclic 3′,5′-phosphate of the formula:

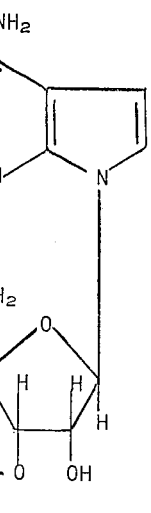

which comprises: heating sparsomycin A 5'-dihydrogen phosphate with a condensing agent selected from the group consisting of dialkylcarbodiimides and cycloalkylcarbodiimides in a basic, anhydrous solvent medium to give sparsomycin A cyclic 3',5'-phosphate.

5. The process of claim 4 wherein the basic, anhydrous solvent medium is anhydrous pyridine containing 4-morpholinyl - N,N' - dicyclohexylcarboxamidine and the condensing agent is N,N'-dicyclohexylcarbodiimide.

No references cited.

LEWIS GOTTS, Primary Examiner.
JOHNIE R. BROWN, Assistant Examiner.